June 29, 1954  W. M. WILCOX  2,682,098
HACKSAW
Filed April 18, 1952
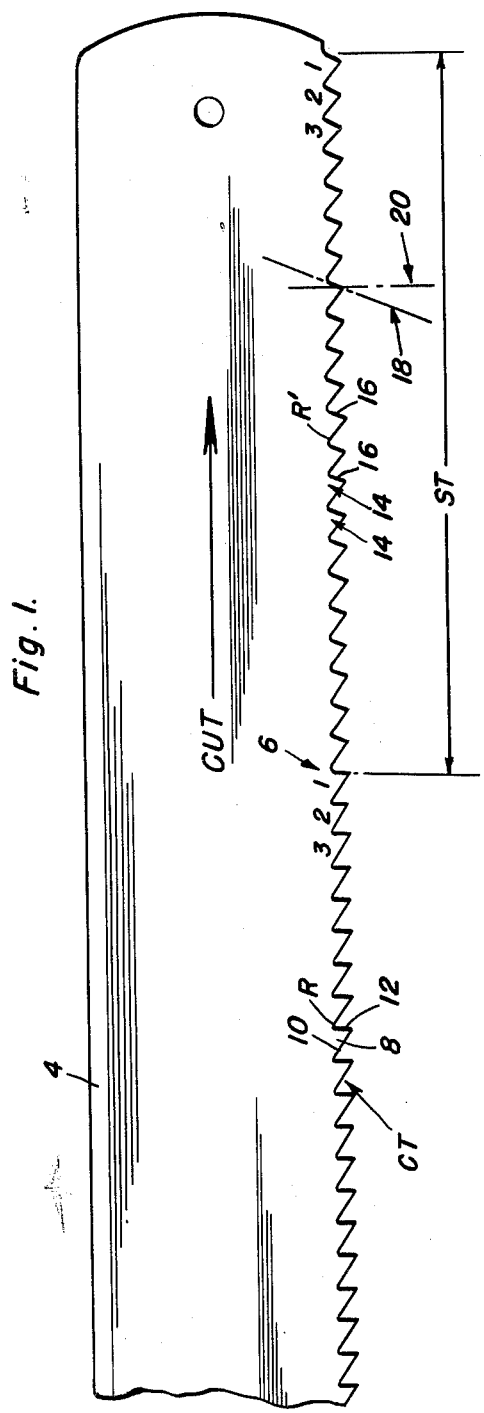
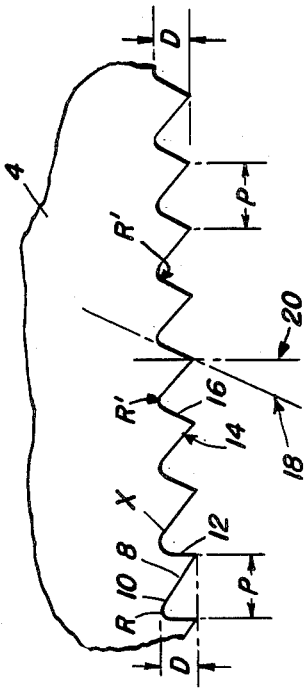
Walter M. Wilcox
INVENTOR.
BY
Attorneys Patented June 29, 1954

2,682,098

UNITED STATES PATENT OFFICE 2,682,098

HACKSAW

Walter M. Wilcox, Westminster, Mass., assignor to Simonds Saw & Steel Co., Fitchburg, Mass., a corporation of Massachusetts Application April 18, 1952, Serial No. 282,964

3 Claims. (Cl. 29—95)

This invention relates to certain new and useful improvements in a hacksaw, either a hand-type or saw machine type, having novelly constructed and arranged teeth, the latter characterized by a series of conventional coarse cutting teeth throughout the median or major intermediate portion and the trailing portion of the length of the blade, and a companion series of specially designed coarse starter teeth throughout the remainder or leading portion of said blade, the latter teeth constituting cut initiating and blade piloting teeth, whereby to thus provide a practical blade which readily starts the kerf and thereafter leads and guides the principal cutting teeth with easy fast sawing results.

In carrying out the principles of the invention the main cutter teeth are unaltered while the improved starter teeth are contoured to provide a unique profile which is such that starting a cut is much more satisfactorily and accurately achieved and stripping or shelling of both starter and cutter teeth is reduced to a minimum and in most instances virtually eliminated. Also, with the herein revealed accomplishment there is no appreciable or noticeable reduction or loss in over-all cutting speed, no increase in work or the power required and on thin sections of workpieces a coarser, faster cutting pitch, than could otherwise be used, can be used due to the fact that stripping is a factor which need not be seriously contended with. What is more, the all inclusive tooth means is such that no special problems and operations are met in manufacturing and aptly producing the improved saw blade.

It is a matter of common knowledge to those familiar with hacksaws that when the usual coarse cutting teeth are presented to the surface to be sawn, the leading edges of the teeth, which are straight and at right angles to the lengthwise dimension of the blade, gouge in, grab and produce a disruptible "hitch action." Also, when presented to the work with said edges parallel to the work, the teeth often glance off and veer to the right or left of the desired line of cleavage. Further, the commonly designed tooth (or teeth) at the start often penetrates deeper than it has ability to chip off and remove the stock. The built up and reactionary pressure then gives way and the saw jumps out of the cut resulting, as is generally the case, in stripping or otherwise damaging one or more teeth. Confronted with this problem inventors and manufacturers have evolved and produced hacksaws of many and varied forms and constructions hoping to successfully cope with it all having the same general objective; namely, to prevent the teeth from breaking when starting the cut and in arranging improved teeth to make starting easier for the unimpeded follow-through of the blade proper.

Some have suggested the adoption and use of a battery or group of very fine file-like starter teeth but these clog on soft materials and impair efficiency after the starting cut has been made. And what with the pitch and depth of the starter teeth different from the pitch and depth of the principal cutting teeth, the setting dies set for the latter teeth cut into the body of the blade at the locus of the fine starting teeth. Such an approach to the instant problem cannot, therefore, be endorsed.

One prior patent which introduces a construction to meet the problem has to do with a saw blade provided with teeth all having substantially the same pitch and chip clearance opening and wherein a series of said teeth at the starting end having shallower depths than the remainder of the teeth. It is believed that a blade of this construction is impractical to construct. A check on the mathematics shows that to keep the teeth shallow enough to prevent grabbing at the start, it would be possible, holding the pitch, to get the same chip room or space as called for. Even were this possible, by having a varying condition of depths there would be no protection unless the user of the saw started at the very end each time, a very impractical requirement indeed.

A further attempted solution of the problem appertains to a saw blade having a series of relatively coarse teeth and associated therewith a series of teeth of substantially the same pitch but of lesser gullet openings than the first mentioned teeth. Here certain disadvantages are to be noted. The feature becomes a detraction after its function of starting the cut without breakage is performed. The large included angle at the point requires much more than normal pressure to make a cut and thus tends to cancel out the point strength. As in all "conventional" hacksaws with the leading or front edge or face at 90 degrees in respect to the lengthwise axis or dimension of the blade, the grab is there, even if the depth of cut is limited and it can, therefore, break at the base, build up a force resulting from the stated "grab."

The present invention appertains to a blade construction along the aforementioned lines which seeks to improve structurally, functionally and otherwise on prior art constructions and has to do with an adopted construction in which manufacturers, retailers and users will find their respective requirements and needs fully met and effectually contained.

Briefly, the preferred embodiment of the invention has to do with a blade provided with teeth all having the same pitch, depth and chip clearance spaces therebetween, wherein a predetermined number of the teeth at the leading end of the blade having leading edges each having a negative rake angle which is susceptible of producing a lifting component proportionate to the ease of cutting of the material acted on, the rake angle being oblique to the lengthwise dimension of the blade and the obliquity, under ordinary circumstances, being at approximately 15 degrees more or less.

Other objects, features and advantages will become more readily apparent from the following description and the accompanying sheet of drawings.

In the accompanying sheet of drawings wherein like reference characters are employed to designate like parts throughout the views:

Figure 1 is an enlarged fragmentary face or side elevational view of a hacksaw blade having saw edge teeth arranged and constructed in accordance with the specific principles of the instant invention;

Figure 2 is a fragmentary view on a still larger scale which shows the starting teeth compared with one of the regular cutting teeth and includes diagrammatic markings to assist in understanding the subject matter presented; and Figure 3 is an edge view, in elevation, showing the manner in which all teeth are angularly set to the left and right and with the intervening coplanar clearer teeth.

Referring now to the drawings by way of reference characters it will be seen in Figure 1 that the hacksaw blade is denoted by the numeral 4 and in general over-all appearance resembles any ordinary or conventional hacksaw blade construction. The toothed edge may be said to be made up of groups of teeth conveniently referred to by the numerals 1, 2 and 3 respectively, as to both classes of teeth here concerned, and these as shown in Figure 3 represent regular coarse teeth with the teeth 2 and 3 offset in opposite directions in respect to the body of the blade and with the complemental tooth 1 in coplanar position to function as a raker or clearer as usual. Such an arrangement is found in the average saw and is shown here for completeness of coverage of the construction. The battery or series of coarse cutting teeth are denoted at CT and these range from a leading end portion of the blade and through the major intermediate or approximate median portion 6 of the blade from right to left where they terminate at the trailing end of the blade (not shown). Each individual cutting tooth is conveniently denoted by the numeral 8 and has the usual upwardly and rearwardly inclined trailing or back edge 10 and the straight vertical leading or advance edge 12, the latter being at 90 degrees or at right angles to the longitudinal axis or lengthwise dimension of the blade. Obviously, then, this is what is referred to herein as a conventional coarse cutter tooth of common profile. Referring for convenience to Figure 2 this tooth 8 has its radius at R and the lines D denote the depth of said tooth.

The improved starting teeth range between the arrow marking and this distance or range is identified at ST. In practice any number of starter teeth may be employed as required, these being at a leading end portion of the blade and generally distributed along such portion from the start of the serration to the battery of regular or cutting teeth, said latter beginning usually at some point substantially forward of mid-length of the blade, as appropriate for the over-all length, size and use for the particular blade. As shown at the right in Figure 2 the broken line denoted at D denotes the depth of the starter teeth. The radius marking is at R'. The broken line P denotes the pitch of the cutting teeth 8 and identical or corresponding pitch of the starter teeth 14. It is to be pointed out here that in the exemplary illustrated embodiment the pitch, radius and depth of all of the teeth throughout the length of the cutting edge are shown as being the same. The distinction, therefore, is that the leading edge of the teeth 14, the edge denoted at 16 is oblique to the axis of the blade. The line of obliquity is denoted at 18 and for comparison the 90 degree or right angular line 20 represents or corresponds with the angle 12 of the main cutting teeth 8. As stated the pitch of the starting or pilot teeth 14 is the same as the pitch of the conventional teeth 8. The radius R' is usually but not necessarily the same as the radius R of the conventional teeth and the depth D is equal to the depth D of the conventional teeth. The rake angle, an important factor of the starting function, is approximately minus 15 degrees, that is, the tooth front edge 16 is inclined rearwardly, toward the trailing end of the blade, in the direction from the root to the outer point of a tooth. The distortion of setting frequently produces a hook or rake angle of 7 degrees or more. The clearance angle of the pilot teeth, that is, the angle between the back edge of a tooth and the line of cut (the bottom of the kerf and paralleling the blade axis), is usually that angle which will make the tooth back edge tangent to radius R' when the obliquity of the leading edges 16 is approximately 15 degrees, as is obvious.

In holding the pitch of pilot and conventional teeth constant in the same saw, and the depth constant (which are features of this design), if the radius R' is held constant, the clearance angle must change when the rake angle changes. In many cases it is just as satisfactory to maintain the clearance angles equal, make the rake angle the approximate minus 15 degrees, and adjust the radius or radii to tangency with the back and front. This largely depends upon the radius assumed for the conventional tooth.

As covered in the description, manufacturing of the improved blade is rendered practical by holding the pitch and depth constant, a feature not found in known prior art constructions. This obviously makes the improved saw practical from a fabricating standpoint. More importantly, the negative rake feature regulates the depth of cut in starting in an automatically varying way. By this it is meant that rather than have a fixed limit on the depth of cut as in the case of other constructions, that is, by depth of tooth, pitch of tooth or chip space clearance angle, the negative angle produces a lifting component proportionate to the ease of cutting or machineability of the material being sawed so that on softer material efficiency is not appreciably reduced over hard material. And so, a further advantage is that it is unnecessary to stock the blade without the starting tooth for special cases. This also means that once the entering cut has been made, the efficiency during the rest of the cut is kept high and dependable.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A hacksaw comprising a blade having a battery of relatively coarse cutting teeth ranging along the cutting edge throughout a major intermediate portion and to the trailing end of the blade, and a complemental battery of equally coarse starting teeth ranging from said battery of cutting teeth to the leading end of the blade, the leading edges of said cutting teeth being at approximate right angles to the lengthwise axis of the blade and the leading edges of said starting teeth being at oblique angles to said axis, the obliquity of said leading edges being such that the inclination of each such edge is in a rearward direction toward said trailing end, and the pitch and depth of all of the teeth being the same.

2. A hacksaw comprising a blade having a battery of relatively coarse cutting teeth ranging along the cutting edge throughout a major intermediate portion and to the trailing end of the blade, and a complemental battery of equally coarse starting teeth ranging from said battery of cutting teeth to the leading end of the blade, the leading edges of said cutting teeth being at approximate right angles to the lengthwise axis of the blade and the leading edges of said starting teeth being at oblique angles to said axis, the pitch and depth of all teeth being the same, and the rake angle of said oblique-edged teeth being approximately fifteen degrees negative.

3. A saw blade provided with teeth, all having the same pitch, depth and chip clearance spaces therebetween, a predetermined number of the teeth at the leading end of said blade having leading edges each having a negative rake angle susceptible of producing a lifting component proportionate to the ease of cutting of the material acted on, said negative rake angle being oblique to the lengthwise dimension of the blade, the obliquity being about fifteen degrees.

References Cited in the file of this patent

UNITED STATES PATENTS

| Number | Name | Date |
| --- | --- | --- |
| 1,130,649 | Whiteaker | Mar. 2, 1915 |
| 1,381,478 | Lawrence | June 14, 1921 |
| 2,306,187 | Ronan | Dec. 22, 1942 |

FOREIGN PATENTS

| Number | Country | Date |
| --- | --- | --- |
| 294,139 | Great Britain | May 22, 1921 |